US012617624B2

(12) United States Patent
Bogle

(10) Patent No.: US 12,617,624 B2
(45) Date of Patent: May 5, 2026

(54) MODULAR METAL-LINK CONVEYOR BELT

(71) Applicant: Laitram, L.L.C., Harahan, LA (US)

(72) Inventor: David W. Bogle, Franklinton, LA (US)

(73) Assignee: Laitram, L.L.C., Harahan, LA (US)

( * ) Notice: Subject to any disclaimer, the term of this patent is extended or adjusted under 35 U.S.C. 154(b) by 86 days.

(21) Appl. No.: 18/843,976

(22) PCT Filed: Mar. 14, 2023

(86) PCT No.: PCT/US2023/015182
§ 371 (c)(1),
(2) Date: Sep. 4, 2024

(87) PCT Pub. No.: WO2023/200542
PCT Pub. Date: Oct. 19, 2023

(65) Prior Publication Data
US 2025/0187840 A1 Jun. 12, 2025

Related U.S. Application Data

(60) Provisional application No. 63/330,569, filed on Apr. 13, 2022.

(51) Int. Cl.
*B65G 17/06* (2006.01)

(52) U.S. Cl.
CPC ........... *B65G 17/06* (2013.01); *B65G 17/067* (2013.01); *B65G 17/068* (2013.01)

(58) Field of Classification Search
CPC ..... B65G 17/06; B65G 17/068; B65G 17/067
USPC .................................................. 198/850, 853
See application file for complete search history.

(56) References Cited

U.S. PATENT DOCUMENTS

| | | | | |
|---|---|---|---|---|
| 4,394,901 | A * | 7/1983 | Roinestad | ............ B65G 17/068 |
| | | | | 474/212 |
| 4,953,693 | A | 9/1990 | Draebel | |
| 5,586,643 | A | 12/1996 | Zabron et al. | |
| 6,360,882 | B1 | 3/2002 | Maine, Jr. et al. | |
| 6,986,420 | B2 * | 1/2006 | Weiser | ................... B65G 17/08 |
| | | | | 198/853 |
| 7,364,036 | B2 | 4/2008 | Schoepf | |
| 7,494,006 | B2 * | 2/2009 | Knott | ..................... B65G 17/42 |
| | | | | 198/853 |
| 8,857,607 | B2 * | 10/2014 | Lasecki | ................ B65G 17/064 |
| | | | | 198/850 |
| 2001/0050214 | A1 * | 12/2001 | Guldenfels | .......... B65G 17/086 |
| | | | | 198/853 |
| 2012/0125742 | A1 * | 5/2012 | Corley | ................. B65G 17/086 |
| | | | | 198/850 |
| 2015/0298910 | A1 * | 10/2015 | Oertling | ................. B65G 17/08 |
| | | | | 198/850 |
| 2024/0417178 | A1 * | 12/2024 | Bogle | .................. B65G 17/064 |

FOREIGN PATENT DOCUMENTS

| | | | | |
|---|---|---|---|---|
| EP | 1495996 A2 | 1/2005 | | |
| JP | 2003182829 A | * 7/2003 | ............. | B65G 17/08 |

* cited by examiner

*Primary Examiner* — James R Bidwell
(74) *Attorney, Agent, or Firm* — James T. Cronvich

(57) ABSTRACT

Metal-link conveyor belt modules and belts made of such modules. The belt modules have a crossbar. Links extend from opposite sides of the crossbar and terminate in loops. The links have regions of different widths tailored to various operational requirements.

16 Claims, 4 Drawing Sheets

60

MODULAR METAL-LINK CONVEYOR BELT

BACKGROUND

The invention relates to power-driven conveyors and more particularly to conveyor belts constructed of hinge-linked wire-link belt modules.

Metal wire belts are often used as lightweight, easy-to-clean conveyor belts. The thin metal wires responsible for the light weight of the metal belt also provide plenty of open area, which can be useful if the conveyed products require a lot of airflow or drainage. But the uniformly thin metal wires and the large open areas do not provide adequate support for some products, especially softer products. And the thin metal wire links tend to wear along the bottom.

SUMMARY

One version of a conveyor belt module embodying features of the invention comprises first and second metal links and a crossbar that has a length extending laterally in a width direction of the conveyor belt module and that has a first side and an opposite second side. The first metal links extend in length from the first side of the crossbar to a first end; the second metal links extend in length from the second side of the crossbar to a second end. The first metal links each have a loop at the first end, and the second metal links each have a loop at the second end. The loops each have an upper segment, a lower segment, a distal curved segment between the upper and lower segments, and a proximal curved segment between the upper and lower segments closer to the crossbar than the distal curved segment. The upper segments have a first lateral width in a widened region extending from the crossbar to a point short of the distal curved segment, and the lower segments have a second lateral width in a widened region between the distal and proximal curved segments. The distal and proximal curved segments have a third lateral width. The first and second lateral widths are greater than the third lateral width.

Another version of a conveyor belt module comprises first and second metal links and a crossbar that has a length extending laterally in a width direction of the conveyor belt module and that has a first side and an opposite second side. The first metal links extend in length from the first side of the crossbar to a first end; the second metal links extend in length from the second side of the crossbar to a second end. The first metal links each have a loop at the first end, and the second metal links each have a loop at the second end. The loops each have an upper segment, a lower segment, a distal curved segment between the upper and lower segments, and a proximal curved segment between the upper and lower segments closer to the crossbar than the distal curved segment. The lateral width of the proximal curved segments is less than the lateral width of the upper segment or the lower segment or both.

DETAILED DESCRIPTION

Figure 1:
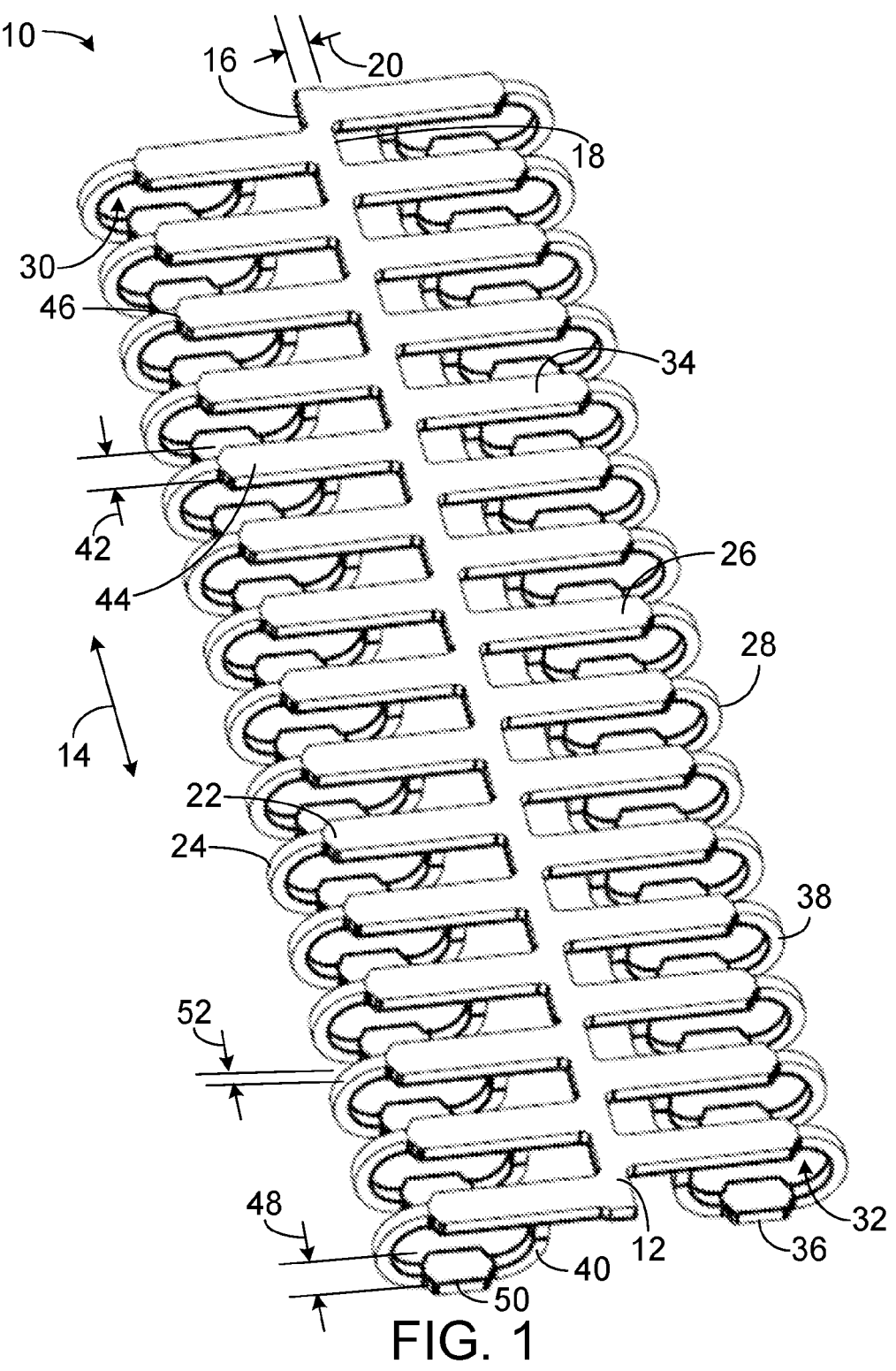
FIG. 1 is a pictorial view of one version of a metal-link conveyor belt module embodying features of the invention.

A wire-link conveyor belt module embodying features of the invention is shown in FIG. 1. The module 10 has a crossbar 12 that has a length that extends laterally in a width direction 14 of the module. The crossbar has a first side 16 and a second side 18 defining the crossbar's width 20. First metal links 22 extend in length from the first side 16 of the crossbar 12 to first ends 24. Second metal links 26 extend from the second side 18 of the crossbar 12 to second ends 28 in the opposite direction. Although the first metal links 22 are shown laterally offset from the second metal links 24, they could be aligned with each other.

The first and second metal links 22, 26 have first and second loops 30, 32 at the first and second ends 24, 28. Each loop 30, 32 has four segments: an upper segment 34, a lower segment 36, a distal curved segment 38, and a proximal curved segment 40. The upper segment 34 extends from the crossbar 12. The distal curved segment 38 extends from the upper segment 34 to the lower segment 36 and forms a curved end of the loop 30, 32 distal from the crossbar 12. The proximal curved segment 40, which is between the lower segment 36 and the upper segment 34, is closer to the crossbar 12 than is the distal curved segment 38. The proximal curved segment 40 forms an opposite curved end of the loop 30, 32.

The upper segment 34 has a first lateral width 42 in a widened region 44 that extends from the crossbar 12 to a point 46 short of the distal curved segment 38. The lower segment 36 has a second lateral width 48 in a widened region 50 between the distal and proximal curved segments 38, 40. The remainder of the metal links 22, 26, including the distal and proximal curved segments 38, 40 and portions of the upper and lower segments 34, 36, have a third lateral width 52.

In this version the first and second lateral widths 42, 48 are greater than the thin third lateral width 52, which can be narrow when the module 10 is used in a conveyor belt in which belt pull is borne largely by other belt elements, such as outer tension links. And the first and second lateral widths 42, 48 of the widened regions 44, 50 are equal. The widened region 44 of the upper segment 34 is longer than the widened region 50 of the lower segment 36. The width 20 of the crossbar 12 is greater than the third lateral width 52, but less than the first and second lateral widths 42, 48.

But the apportionment of the widths can be tailored to various operational requirements. For example, the first and second lateral widths 42, 48 do not have to be the same. If product support is less important than wear of the loops 30, 32, the second width 48 can be made greater than the first width 42. As another example, the width of the distal curved segments 38 can be increased to be thicker than the width of the proximal curved segments 40 if the loops 30, 32 have to bear the belt pull when installed in a conveyor belt. And the width of the crossbar doesn't have to exceed the third lateral width.

Figure 2:
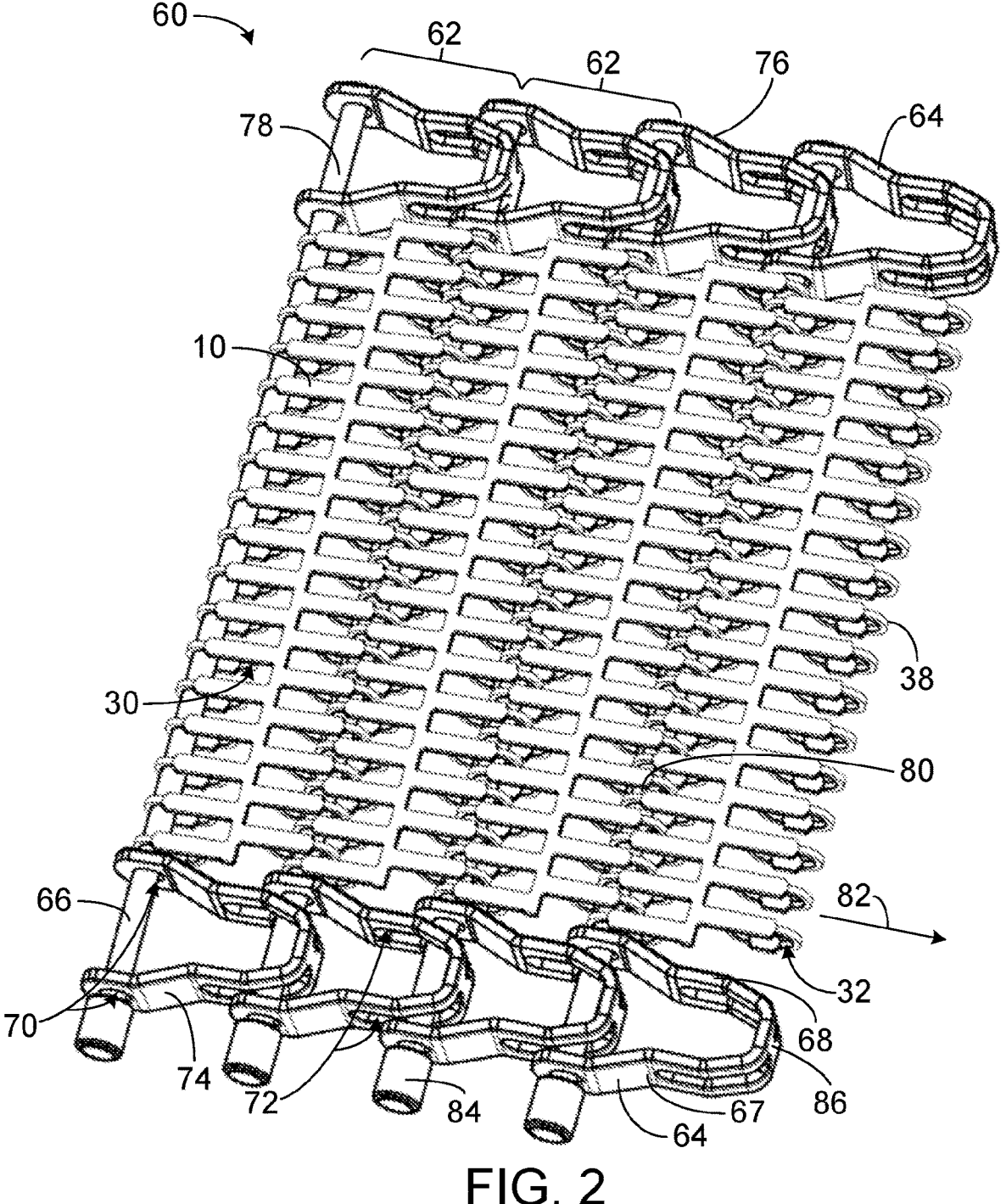
FIG. 2 is a pictorial view of a portion of a conveyor belt constructed of belt modules as in FIG. 1 shown from a top-side perspective.
Figure 3:
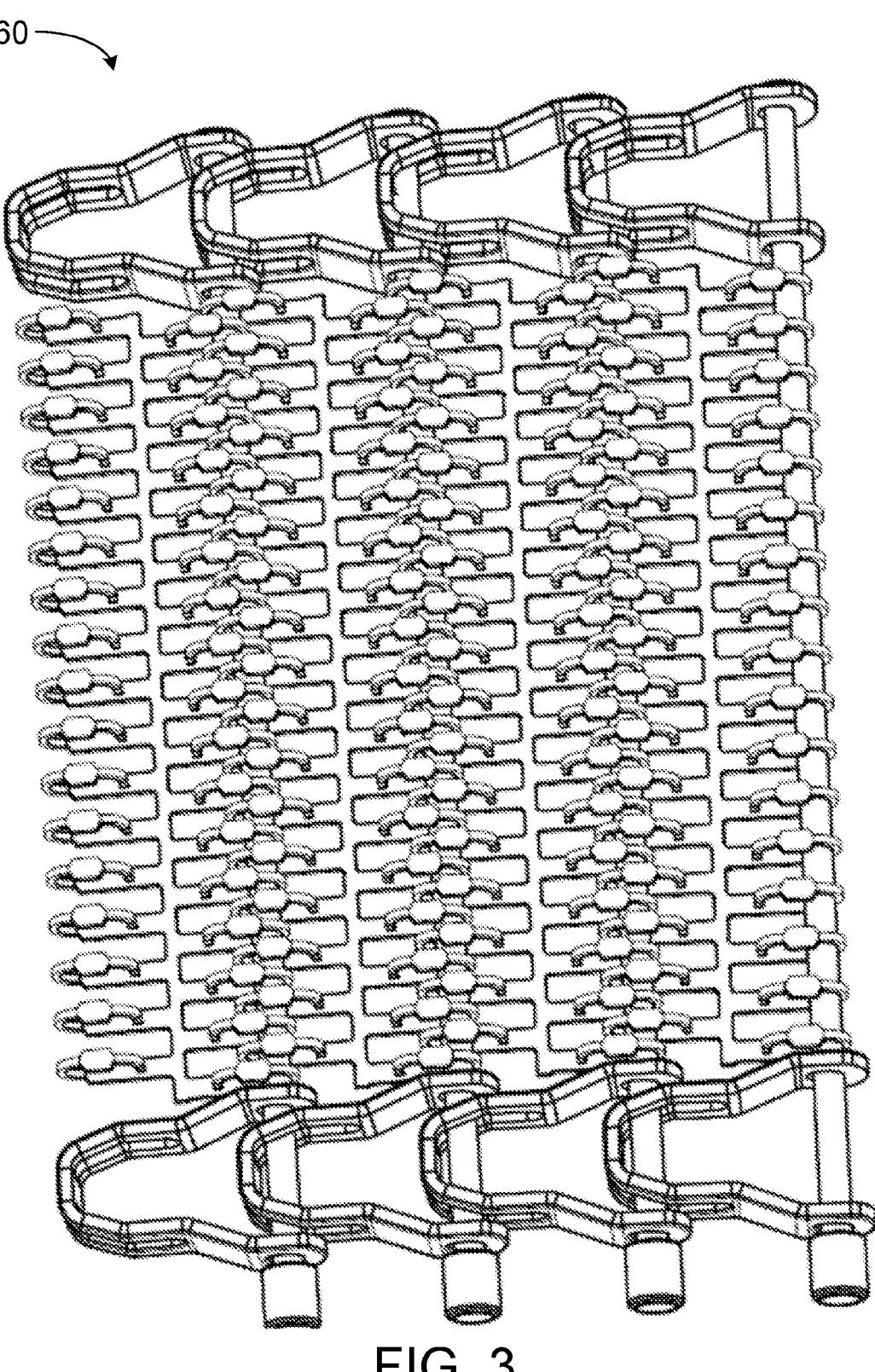
FIG. 3 is a pictorial view of the conveyor belt portion of FIG. 2 from a bottom-side perspective.

The conveyor belt module 10 of FIG. 1 is used to construct a conveyor belt as in FIGS. 2 and 3. The conveyor belt 60 is constructed of a series of belt rows 62. Each belt row 62 includes one or more belt modules 10 (one in this example). U-shaped tension links 64 at first and second outer sides 74, 76 of each belt row 62 have a base 86 and two arms 67, 68 having first and second rod holes 70, 72 through each arm of the U. The first loops 30 of the belt modules 10 align with the first rod holes 70 in the tension links 64. The second loops 32 of the belt modules 10 align with the second rod holes 72. The first loops 30 and first rod holes 70 of a belt row 62 are aligned with the second loops 32 and the second rod holes 72 of an adjacent belt row to form a lateral passageway that extends from a first outer side 74 of the belt 60 to an opposite second outer side 76. Hinge rods 78 received in the passageways join the belt rows 62 together at hinge joints 80 at which the rows can articulate.

Because the conveyor belt 60 of FIGS. 2 and 3 uses tension links 64 to bear the belt pull, the belt modules 10 can use narrow-width distal curved segments 38 in the belt loops 30, 32. The second rod holes 72 through the tension links 64 are also shown elongated in a direction of belt travel 82 to allow the belt 60 to collapse at either of its outer sides 74, 76 when that side is at the inside of a turn. But the second rod holes could be circular—not elongated—in a straight-running belt. Although the belt 60 can be driven by sprockets (not shown) whose teeth drive against the portion 66 of the hinge rods 78 between the arms 67, 68 of the tension links 64, the version shown in FIGS. 2 and 3 has buttons 84 capping ends of the hinge rods 78 laterally outside the tension links at the first outer side 74. The protruding buttons 84 can be used to drive the belt 60 in a side-drive conveyor system or a positive-drive, drum-driven spiral conveyor.

Figure 4:
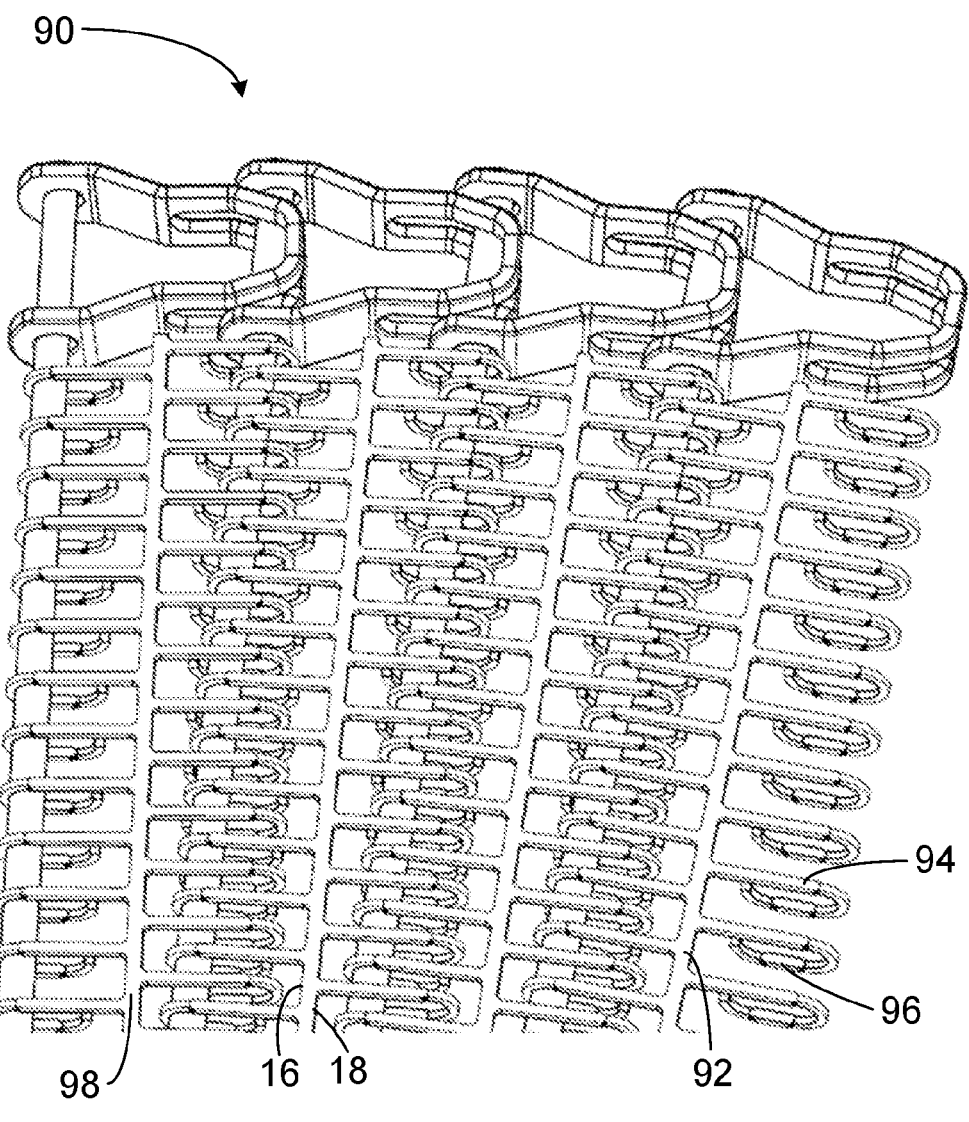
FIG. 4 is a pictorial view of a portion of a conveyor belt constructed of another version of metal-link belt modules embodying features of the invention.

A portion of a slightly different conveyor belt 90 is shown in FIG. 4. It differs from the belt 60 of FIGS. 2 and 3 in that it is constructed of belt modules 92 whose widened regions 94, 96 are narrower than those of the belt module 10 of FIG. 1. In this version, which allows more air flow through conveyed products or provides better drainage, the width of the crossbar 98 from its first side 16 to its second side 18 is greater than the widths of the widened regions 94, 96.

The metal-link modules can be made of a sheet-metal plate stamped or laser-cut to produce a two-dimensional skeleton with links having a rectangular, including square, cross section. The ends of the first and second links can then be bent to form the loops. Alternatively, the belt modules can be formed by metal injection-molding or metal investment-casting.

What is claimed is:

1. A conveyor belt module comprising:
   a crossbar having a length extending laterally in a width direction of the conveyor belt module and having a first side and an opposite second side;
   a plurality of first metal links extending in length from the first side of the crossbar to a first end;
   a plurality of second metal links extending in length from the second side of the crossbar to a second end;
   wherein the first metal links each have a loop at the first end and the second metal links each have a loop at the second end;
   wherein the loops each have an upper segment, a lower segment, a distal curved segment between the upper and lower segments, and a proximal curved segment between the upper and lower segments closer to the crossbar than the distal curved segment;
   wherein the upper segments have a first lateral width in a widened region extending from the crossbar to a point short of the distal curved segment;
   wherein the lower segments have a second lateral width in a widened region between the distal and proximal curved segments;
   wherein the distal and proximal curved segments have a third lateral width; and wherein the first and second lateral widths are greater than the third lateral width.

2. A conveyor belt module as claimed in claim 1 wherein the first and second lateral widths are equal.

3. A conveyor belt module as claimed in claim 1 wherein the widened region of the upper segment is longer in length than is the widened region of the lower segment.

4. A conveyor belt module as claimed in claim 1 wherein the crossbar has a width from the first side to the second side that is greater than the third lateral width of the distal and proximal curved segments.

5. A conveyor belt module as claimed in claim 1 wherein the crossbar has a width from the first side to the second side that is greater than the first lateral width of the widened region of the upper segment.

6. A conveyor belt module as claimed in claim 1 wherein the crossbar has a width from the first side to the second side that is greater than the second lateral width of the widened region of the lower segment.

7. A conveyor belt module as claimed in claim 1 wherein the first and second metal links are rectangular in cross section.

8. A conveyor belt module as claimed in claim 1 wherein the crossbar and the first and second metal links are unitarily formed by stamping or laser-cutting a sheet-metal plate or by metal injection-molding or metal investment-casting and then bending the first and second metal links to form the loops at the first and second ends.

9. A conveyor belt module comprising:
   a crossbar having a length extending laterally in a width direction of the conveyor belt module and having a first side and an opposite second side;
   a plurality of first metal links extending in length from the first side of the crossbar to a first end;
   a plurality of second metal links extending in length from the second side of the crossbar to a second end;
   wherein the first metal links each have a loop at the first end and the second metal links each have a loop at the second end;
   wherein the loops each have an upper segment, a lower segment, a distal curved segment between the upper and lower segments, and a proximal curved segment between the upper and lower segments closer to the crossbar than the distal curved segment;
   wherein the lateral width of the proximal curved segments is less than the lateral width of the upper segment or the lower segment or both.

10. A conveyor belt comprising:
    a plurality of belt rows extending in width from a first outer side to a second outer side, each belt row including:
    one or more conveyor belt modules as claimed in claim 9;
    tension links at the first and second outer sides, the tension links having first rod holes aligned with the first loops and second rod holes aligned with the second loops;
    wherein the first rod holes and the first loops of a belt row are aligned with the second rod holes and the second loops of an adjacent belt row to form a lateral passageway extending from the first outer side to the second outer side;
    a plurality of hinge rods received in the lateral passageways to join the belt rows together at hinge joints between adjacent belt rows.

11. A conveyor belt as claimed in claim 10 comprising buttons capping ends of the hinge rods outside the first outer side.

12. A conveyor belt module as claimed in claim 9 wherein the lateral width of the upper segment equals the lateral width of the lower segment.

13. A conveyor belt module as claimed in claim 9 wherein the crossbar has a width from the first side to the second side that is greater than the lateral width of the upper segment.

14. A conveyor belt module as claimed in claim 9 wherein the crossbar has a width from the first side to the second side that is greater than the lateral width of the lower segment.

15. A conveyor belt module as claimed in claim 9 wherein the first and second metal links are rectangular in cross section.

16. A conveyor belt module as claimed in claim 9 wherein the crossbar and the first and second metal links are unitarily formed by stamping or laser-cutting a sheet-metal plate or by metal injection-molding or metal investment-casting and then bending the first and second metal links to form the loops at the first and second ends.

\* \* \* \* \*